United States Patent [19]

Sonobe et al.

[11] Patent Number: 4,646,168
[45] Date of Patent: Feb. 24, 1987

[54] PERPENDICULAR MAGNETIC RECORDING METHOD

[75] Inventors: Yoshiaki Sonobe; Toshiyuki Suzuki, both of Yokohama, Japan

[73] Assignee: Tokyo Shibaura Denki Kabushiki Kaisha, Kawasaki, Japan

[21] Appl. No.: 845,488

[22] Filed: Mar. 28, 1986

Related U.S. Application Data

[63] Continuation of Ser. No. 537,561, Sep. 30, 1983, abandoned.

[30] Foreign Application Priority Data

Oct. 4, 1982 [JP] Japan ................. 57-174307

[51] Int. Cl.[4] .............................. G11B 5/02
[52] U.S. Cl. ........................ 360/18; 360/20
[58] Field of Search ............. 360/18, 19.1, 20

[56] References Cited

U.S. PATENT DOCUMENTS

| | | | |
|---|---|---|---|
| 3,188,615 | 6/1965 | Wilcox | 340/174.1 |
| 3,200,207 | 8/1965 | Rainer et al. | 360/18 |
| 3,732,364 | 5/1973 | Terada | 178/6.6 |
| 3,945,035 | 3/1976 | Goldman | 360/7 |
| 4,313,140 | 1/1982 | Keidl | 360/18 |
| 4,380,779 | 4/1983 | Kitamura et al. | 360/18 |

FOREIGN PATENT DOCUMENTS

| | | |
|---|---|---|
| 0030644 | 6/1981 | European Pat. Off. |
| 2916473 | 10/1979 | Fed. Rep. of Germany .......... 360/7 |
| 3229811 | 2/1983 | Fed. Rep. of Germany .......... 360/7 |

OTHER PUBLICATIONS

"Recording Servo Information Below a Data Surface in a Homogeneous Medium" by T. A. Schwartz, IBM TDB, vol. 17, #2, 7/74.
B. J. Langland and P. A. Albert, "Recording on Perpendicular Anisotropy Media with Ring Heads", IEEE Mag-17, 2547, Nov. 1981.

Primary Examiner—Vincent P. Canney
Attorney, Agent, or Firm—Oblon, Fisher, Spivak, McClelland & Maier

[57] ABSTRACT

A perpendicular magnetic recording method for recording two kinds of signals on a magnetic recording medium which has perpendicular magnetic anisotropy, recording the first kind of signal on the recording medium with a linear recording density higher than 30 kBPI, and then recording the second kind of signal on that recording track on which the first kind of signal has been recorded, with a linear recording density which is 15 or more kBPI lower than that of the previously-recorded signal, whereby two kinds of signals can be recorded on the same recording medium in such a way that they are superimposed on one another. These two kinds of signals are detected at the same time by one magnetic head and frequency-separated by a reproduced signals processing circuit which is provided with high and low pass filters.

16 Claims, 9 Drawing Figures

PERPENDICULAR MAGNETIC RECORDING METHOD

This application is a continuation of application Ser. No. 537,561, filed Sept. 30, 1983, now abandoned.

BACKGROUND OF THE INVENTION

The present invention relates to a perpendicular magnetic recording method particularly, to a perpendicular magnetic recording method by which two or more kinds of signals can be superimposed on a recording medium.

A demand exists in the magnetic recording field for methods that can increase recording density, i.e. the ability to record great quantities of information on a compact recording medium. Recording density increase requires increase in the linear recording density as well as increases in track density.

The so-called longitudinal magnetic recording method is intended to lay magnetization in-plane and longitudinal direction of the recording medium and this method had been widely employed. In the case of the longitudinal magnetic recording method, high track density is made possible by using the tracking servo mechanism of high accuracy, etc. This method, however, has a limit in increasing linear recording density, because the demagnetizing field inside the recording medium increases, when the linear recording density is increased, thereby weakening the magnetization amplitude making it impossible to achieve a high quality recording. Therefore, the recording density or area recording density (recording amount per unit area of the recording medium) can not be increased dramatically.

On the other hand, the so-called perpendicular magnetic recording method is designed to use a recording medium which has an axis of magnetization in the depth (or perpendicular) direction, i.e. perpendicular magnetic anisotropy and to magnetize the recording medium in the depth (or perpendicular) direction thereof. This perpendicular magnetic recording method enables the linear recording density to be increased since the demagnetizing field inside the recording medium decreases as the linear recording density increases. This method, however, exibits different recording characteristics, from those for the longitudinal recording. Therefore, the perpendicular magnetic recording method can not employ the conventional track following servo techniques, such as a buried servo technique, which is one of the most advanced track following servo techniques used for the logntiduinal magnetic recording method. When compared with the longitudinal magnetic recording method, therefore, the perpendicular magnetic recording method can easily achieve a higher recording density but has a track density limit.

SUMMARY OF THE INVENTION

An object of the present invention is therefore to provide a perpendicular magnetic recording method by which two or more kinds of signals can be superimposed on upon the other.

Another object of the present invention is to provide a perpendicular magnetic recording method by which a high track density can be attained to drastically increase area recording density.

According to the present invention, there is provided a perpendicular magnetic recording method by which two or more kinds of signals can be recorded with different linear recording densities on a magnetic recording medium which has perpendicular magnetic anisotropy.

When recording two kinds of signals, the first kind of signal is recorded with a first linear recording density on the recording medium, and the second kind of signal is then recorded with a second linear recording density which is 15 or more kilobits per inch (kBPI) lower than the first linear density.

When recording three or more kinds of signals, a third kind of signal is recorded with a linear recording density which is 15 or more kBPI lower than the second linear recording density. Fourth and/or fifth signals are thus recorded successively, each having a linear recording density which is 15 or more kBPI lower than that of the preceding kind of signal.

According, to new finding that, in perpendicular magnetic recording, the higher the linear recording density is, the more stable the recorded magnetization, the reproduction output level of the preceding (or first) kind of signal which has been already recorded is not substantially lowered by the magnetic field in which the following (or second) kind of signal is recorded, but held high enough to be reproduced with high quality. Therefore, the preceding (or first) kind of signal can be held even when the following (or second) kind of signal is recorded.

According to the present invention, therefore, two or more kinds of signals are recorded on the same recording track by being superimposed upon each other, enabling the recording track density to be practically duplicated. The area recording density can therefore be increased dramatically, taking advantage of the perpendicular magnetic recording method which is high in linear recording density. In addition, when normal recording in which signals are not superimposed on each other is carried out, a signal previously recorded is neither erased nor is its reproduction output level lowered by a signal later recorded when those areas where two or more kinds of signals are recorded are, partially or all, overlapped with one another because of recording timing lag, tracking error or the like, thus allowing increased reliability in both recording and reproducing processes.

BRIEF DESCRIPTION OF THE DRAWINGS

FIG. 1 shows level of reproduced signals where a signal is recorded with low linear recording density and another kind of signal is then superimposed with high linear recording density;

FIG. 2 shows levels of reproduced signals in another case where a signal is recorded with high linear recording density and another kind of signal is then superimposed with low linear recording density;

FIG. 3 shows the relationship between levels of reproduced signals and linear recording densities or differences between linear recording densities.

DETAILED DESCRIPTION OF THE PREFERRED EMBODIMENTS

Prior to describing embodiments of the present invention, the principle of the present invention will be explained with reference to FIGS. 1 through 3 which are graphs showing the results of tests conducted by the inventors of the present invention.

Figure 1:
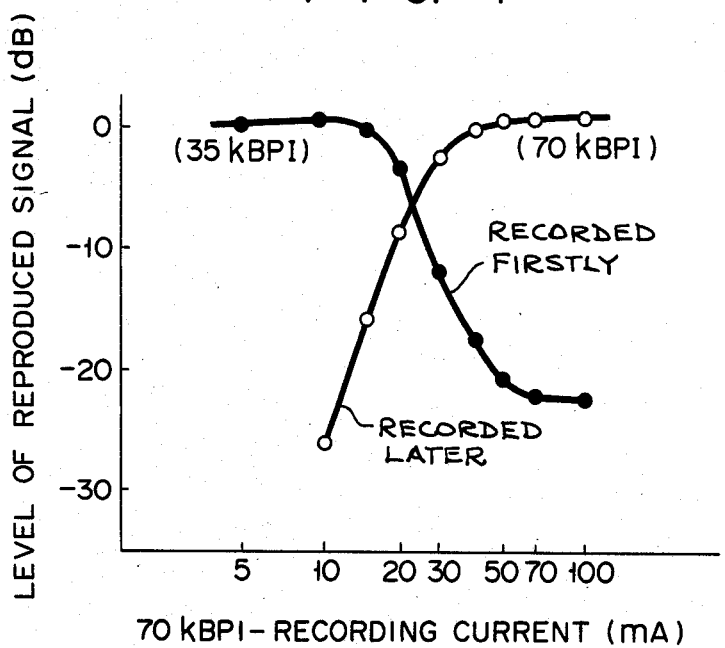
FIGS. 1 through 3 are graphs for explaining the principle of the present invention.
Figure 2:
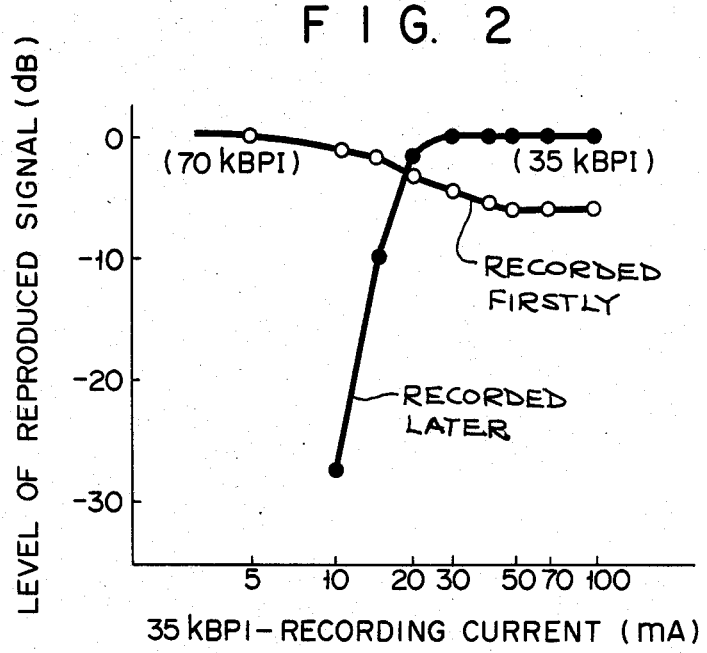
Figure 3:
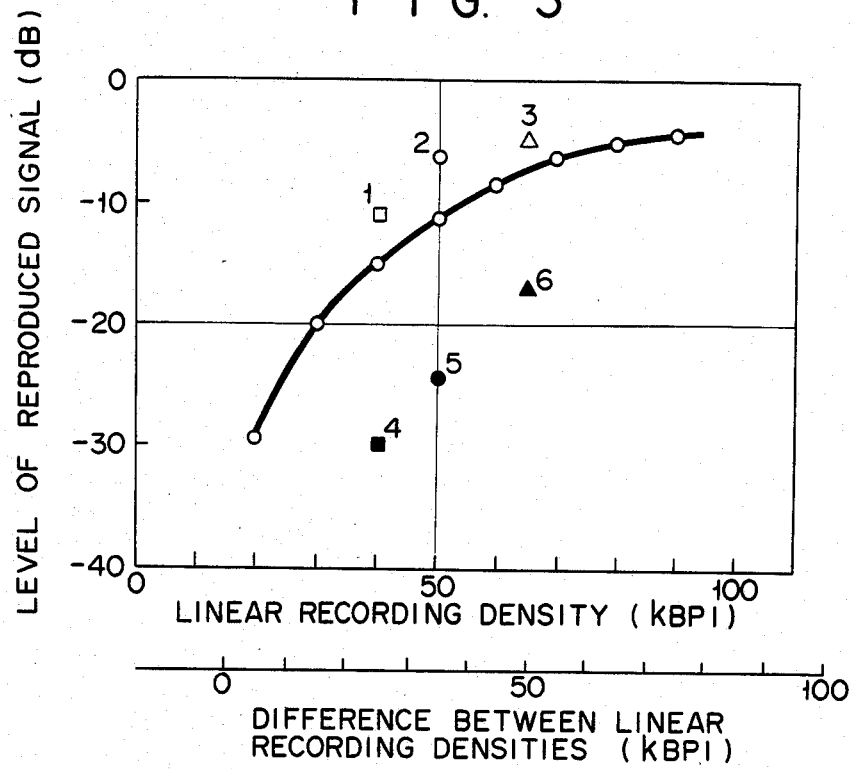

Test results shown in FIGS. 1 through 3 were obtained using a perpendicular magnetic recording medium which had a layer of Co-Cr magnetic material and perpendicular magnetic anisotropy. In the case of this recording medium, film thickness (t) was 1 $\mu$m, coercive force Hc 600 Oe, and saturation magnetization Ms 350G. Digital signals were recorded on the recording medium, using a magnetic head of ring shape whose gap length was 0.25 $\mu$m. FIG. 1 shows reproduced output levels where a signal is recorded with a low linear recording density of 35 kBPI and another kind of signal is then recorded with a high linear recording density of 70 kBPI on that track on which the preceding kind of signal had been recorded. Reproduced output levels of the signal recorded later with 70 kBPI become higher as the recording current of this signal becomes larger. On the other hand, reproducted output levels of signals previously recorded with 35 kBPI become drastically lower as the recording current of the signal recorded with 70 kBPI becomes higher. This is because the signal recorded with 35 kBPI is erased by another kind of signal superimposed upon the other with 70 kBPI.

FIG. 2 shows reproduced output levels in another case where a signal is recorded with the high linear recording density of 70 kBPI and another kind of signal is then recorded with the low linear recording density of 35 kBPI on the same track. Reproduced output levels of the signal recorded later with 35 kBPI increase as the recording current of the signal becomes larger, and when the recording current exceeds 30 mA, reproduced output levels are saturated. In contrast, reproduced output levels of the signal previously recorded with 70 kBPI show no large drop but is lowered a little in spite of the signal superimposed with 35 kBPI. More specifically, even if the recording current of the signal later recorded with 35 kBPI is increased to such an extent that reproduced output levels of the signal are saturated, reproduced output levels of the signal previously recorded with 70 kBPI show a small reduction but are maintained at a level where they can be reproduced with high quality. From these test data in the perpendicular magnetic recording it is clear that magnetization becomes more stable as the linear recording density becomes higher, and that magneization is not pratically influenced by the magnetic field generated from the recording head at the time of the second recording with low linear recording density.

The solid line in FIG. 3 connects remaining reproduced output levels of a signal previously recorded where the signal is recorded with a linear recording density ranging from 20 to 90 kBPI, as seen from the axis of abscissas in FIG. 3, whereupon kind of signal is recorded with a linear recording density of 15 kBPI, at a certain recording current value on that track on which the preceding signal has been recorded. These remaining reproduced output levels are obtained in such a way that reproduced output levels after the signal is recorded with 15 kBPI are normalized by those obtained prior to the recording. Accordingly, the extent to which reproduced output levels of the previously-recorded signal are lowred due to the signal recorded with 15 kBPI is apparent. FIG. 3 demonstrates that the magnetization becomes more stable as the linear recording density of the previously-recorded signal becomes higher. If the linear recording density of the previously-recorded signal is more than 30 kBPI, the lowering of reproduced output levels caused by a signal superimposed with 15 kBPI is only less than 20 dB and can be suppressed to a range which presents no problems when signal recording and reproducing processes occur. In other words, if the difference between the linear recording density of the previously-recorded signal and that of a signal recorded later with low linear recording density is more than 15 kBPI, the decrease of the reproduced output levels of the previously-recorded signal can be suppressed to less than 20dB. Where the previously-recorded signal is a servo-signal and the later-recorded signal is a data signal, the SN ratio of the servo-signal should be more than 30 dB. It is therefore preferable that the servosignal be recorded with more than 50 kBPI or that both signals are recorded in such a way that the difference between linear recording densities of both signals is more than 30 kBPI.

Numerals 1, 2 and 3 in FIG. 3 show remaining reproduced output levels of the previously-recorded signal in those cases where recording with 50 kBPI is followed by recording with 25 kBPI (the difference between linear recording densities is 25 kBPI), where recording with 70 kBPI is followed by recording with 35 kBPI (the difference between linear recording densities is 35 kBPI), and where recording with 100 kBPI is followed by recording with 50 kBPI (the difference between linear recording densities is 50 kBPI). From a comparison between these data and those shown by the solid line, it is clear that the decrease of reproduced output levels is suppressed as the linear recording density of the previously-recorded signal increases, even if the difference between linear recording densities is the same. When these data 1, 2 and 3 are compared with those shown by the solid line where linear recording densities of the previously-recorded signal are the same, remaining reproduced output levels are substantially the same. If linear recording densities of the previously-recorded signal are the same, substantially the same remaining reproduced output levels will tend to occur even when linear recording densities of later-recorded signals become different.

Data shown by numerals 4, 5 and 6 in FIG. 3, which are opposite to those 1, 2 and 3 show the remaining reproduced output levels of the previously-recorded signal where recording with 25 kBPI is followed by recording with 50 kBPI, recording with 35 kPBI is followed by recording with 70 kBPI, and recording with 50 kBPI is followed by recording with 100 kBPI. These data 4, 5 and 6 show the low remaining reproduced output levels in any of those cases where the data 4, 5 and 6 are compared with other data when the difference between their linear recording densities is equalized and when linear recording densities of the previously-recorded signal are also equalized.

It has been found from test results obtained by the inventors of the present invention that the characteristic which shows the above-described relationship between linear recording densities and remaining reproduced output levels is more noticeable as the layer of magnetic material such as Co-Cr in the perpendicular magnetic recording medium thickens and the coercive force Hc increases. In short, as the magnetic layer thickens and the coercive force Hc increases, decrease of reproduced output levels of the signal which was previously recorded with high linear recording density becomes slight.

The above test results were obtained using the magnetic head of ring shape, identical to those often used for longitudinal magnetic recording. Even when various kinds of magnetic heads developed exclusively for use in the perpendicular magnetic recording are employed, linear recording densities and remaining reproduced output level characteristics are identical. The above-mentioned test results were obtained using digital signals as recording signals. Even when analog signals are employed as the recording signals, however, the characteristics are identical.

The present invention has been completed based on the above-described test results. The present invention is characterized in that the linear recording density of the previously-recorded signal is made higher than that of later-recorded signal, and that the linear recording density of the previously-recorded signal is made higher than 30 kBPI, preferably higher than 50 kBPI, or that the difference between linear recording densities of both signals is made larger than 15 kBPI, preferably larger than 30 kBPI, in the case of perpendicular magnetic recording where two kinds of signals are superimposed upon each other in an area that is under the influence of magnetic field generated from the magnetic head. When thus conditioned, the decrease or deterioration of reproduced output levels of the previously-recorded signal can be suppressed to less than 20 dB and both kinds of signals superimposed on each other can be reproduced with high quality.

Figure 4:
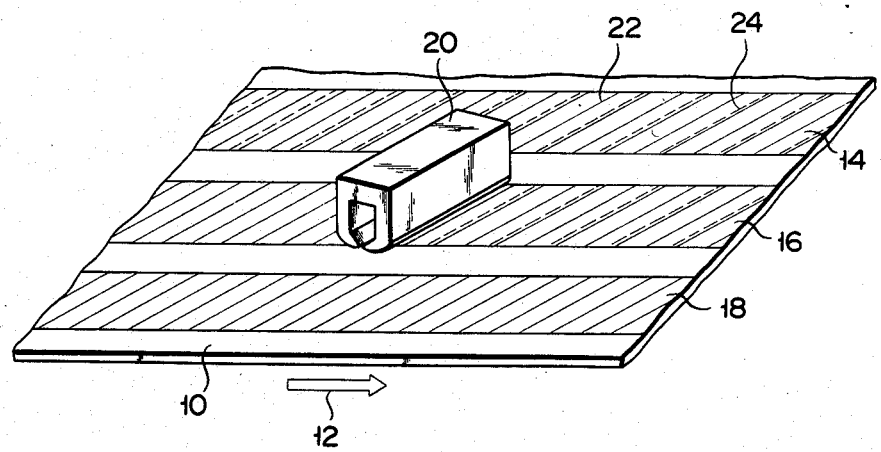
FIGS. 4 through 9 show modes of embodiments according to the present invention.

Some of the embodiments according to the present invention will be described referring to FIGS. 4 through 9. FIG. 4 shows an embodiment of the present invention wherein the second kind of signal is recorded on a track on which the first kind of signal has been recorded. Numeral 10 represents a perpendicular magnetic recording medium of tape, disc or sheet shape. The recording medium 10 is linearly moved or rotated in a direction shown by an arrow 12. The first kind of signal 22 has been recorded with high linear recording density on recording tracks 14, 16 and 18 of the recording medium 10, using a magnetic head 20 or other magnetic head (not shown). The area where the first kind of signal has been recorded is denoted by thin solid lines. FIG. 4 also shows that the second kind of signal 24 has been recorded with low linear recording density on the whole of the recording track 14 and on half of the recording track 16, using the magnetic head 20. The area where the second kind of signal 24 has been recorded is represented by thin, broken lines. The magnetic field generated from the magnetic head 20 to record the second kind of signal acts on the recording track 14 and 16 where the first kind of signal 22 has already been recorded. Since the first kind of signal has been recorded with high linear recording density, however, it is neither erased nor is its reproduction output level lowered significantly by this magnetic field, but its reproduced output level remains sufficiently high.

The first and second kinds of signals thus recorded are detected at the same time by a magnetic head, and frequency-separated to be individually reproduced using a reproduced signals processing circuit which is provided with a high-pass filter and a low-pass filter, each having a certain cut-off frequency. Therefore, signals of two channels can be recorded on a same track and separated to be reproduced, thus enabling area recording density to be practically duplicated when compared with that achieved by the conventional perpendicular magnetic recording method.

Signals perpendicularly and magnetically recorded on the recording medium include signals (or data signals) relating to information such as various kinds of digital signals, audio signals, and video signals, and signals (or servo-signals) relating to recording and reproducing processes and excluding information signals such as various kinds of servo-control signals for use to tracking or random access. The first and second kinds of signals may be data signals, or servo-signals or one kind of signal may be a data signal while the other kind of signal is a servo-signal.

Figure 5:
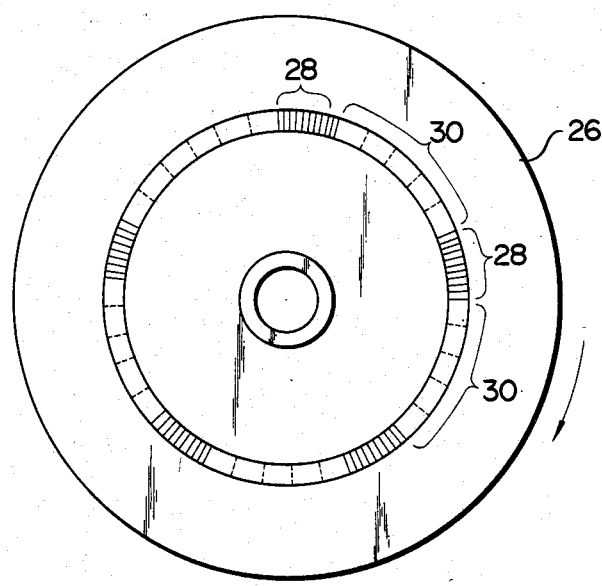

FIG. 5 shows another embodiment of the present invention wherein the first and second kinds of signals are alternately recorded on a recording track. The recording track of a magnetic disc 26 which is rotated in the direction shown by the arrow is divided into an area 28 where the first kind of signal (or servo-signal such as sector address signal, for example) is to be recorded, and an area 30 where the second kind of signal (or data signal, for example) is to be recorded. The first kind of signal is recorded initially in the areas 28 with high linear recording density. The second kind of signal is then recorded in the area 30 with low linear recording density. The linear recording density of the first kind of signal previously recorded is made higher than that of the second kind of signal later recorded, thus the first kind of signal is not erased but can be reproduced with high quality even when a part of the second kind of signal is recorded, because of a lag or a lead or a lead in recording timing, on the area 28 where the first kind of signal has been recorded. This enhances the reliability of recording and reproducing devices.

Figure 6:
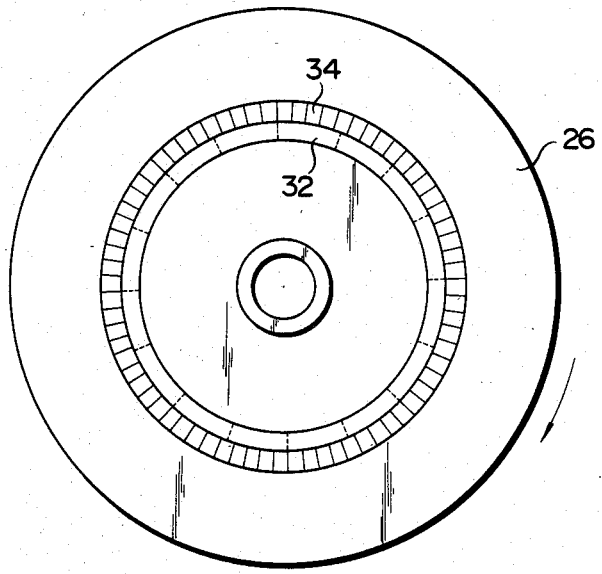

FIG. 6 shows a further embodiment of the present invention wherein the first and second kinds of signals are recorded on two tracks adjacent to each other. More specifically, a magnetic disc 26 has a recording track 32 on which the first kind of signal is recorded, and another recording track 34 on which the second kind of signal is recorded, and these recording tracks 32 and 34 are arranged alternately on the magnetic disc 26 in the radial direction thereof. The first kind of signal is recorded on the track 32 with high linear recording density, and the second kind of signal is then recorded on the track 34 with low linear recording density. Therefore, even if the second kind of signal is recorded, because of a lag or a lead in tracking, on a part or the whole of the track 32 on which the first kind of signal has been recorded, for example, the first kind of signal is not erased but can be reproduced with high quality. In the case of the embodiments shown in FIGS. 5 and 6, the recording medium is not limited to the magnetic disc but may be a magnetic sheet or a magnetic tape.

Figure 7:
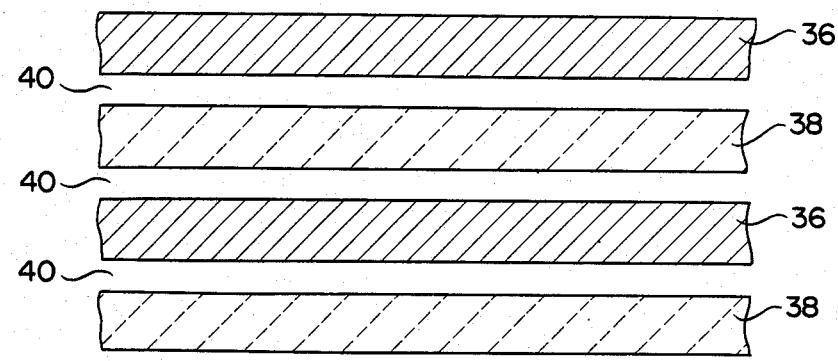
Figure 8:
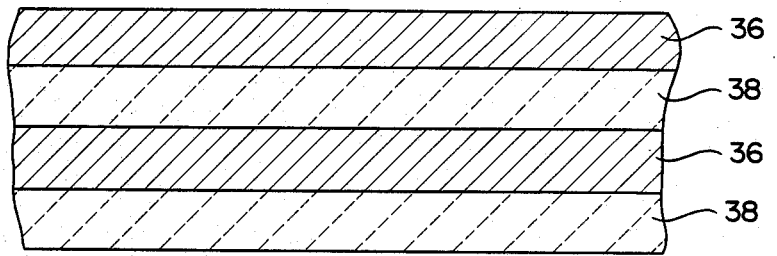
Figure 9:
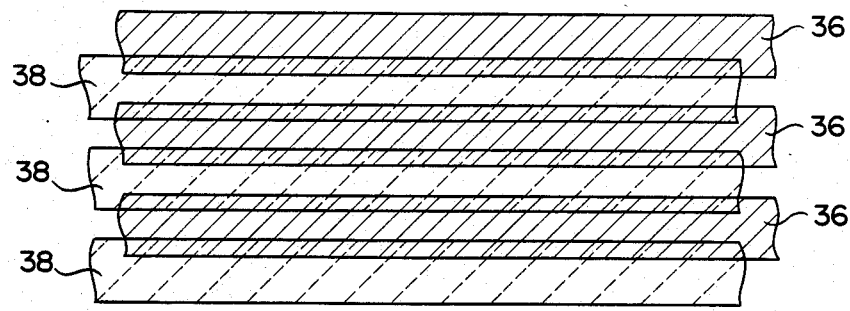

FIGS. 7 through 9 show various kinds of track arrangements. More specifically, FIG. 7 shows a track 36 on which the first kind of signal is recorded, and a track 38 on which the second kind of signal is recorded, alternately arranged with a non-recording area 40 interposed therebetween. FIG. 8 shows both sides of the track 36 in contact with those of the track 38. FIG. 9 shows both sides of the track 36 overlapping those of the track 38. In any of these track arrangements, the first kind of signal is recorded with a linear recording density higher than that of the second kind of signal recorded later, and the reproduced output level of the first kind of signal is not decreased significantly by the recording of the second kind of signal but both kinds of signals can be reproduced with high quality, even in those cases where a space occurs between tracks 36 and 38 (FIG. 7), where both sides of the track 36 are in contact with those of the track 38 (FIG. 8), and where both sides of the track 36 overlap with those of the track 38 (FIG. 9).

While the embodiments described represent some preferred forms of the present invention, it is to be understood that modifications are possible by those skilled in the art without departing from the spirit of the present invention. For example, the embodiments of the present invention have been described referring to the case where two kinds of signals are recorded on the same recording medium. The present invention, however, can be applied when recording three or more kinds of signals in such a way that they or at least some parts of them are superimposed on one another. In this case the first recorded signal is recorded with the highest linear recording density, and the linear recording desities of the second, third --- recorded signals are made lower and lower. More specifically, when a signal has been recorded on an area which is under the influence of a magnetic field generated from the magnetic head at the time of recording another signal with a certain linear recording density, the linear recording density of the later-recorded signal may be lower than that of the previously-recorded signal. Both of the signals can be reproduced with high quality in this manner. Therefore, the track density can be enhanced and the area recording density can be increased. Obviously, numerous modifications and variations of the present invention are possible in light of the above teachings. It is therefore to be understood that within the scope of the appended claims, the invention may be practiced otherwise than as specifically described herein.

What is claimed is:

1. A method for recording signals on a magnetic recording medium, comprising the steps of:
   first recording a first signal on a first area of the recording medium with a first linear recording density; and
   subsequently recording a second signal on a second area of the recording medium with a second linear recording density, the first area being under the influence of the recording magnetic field generated during recording of the second signal,
   the recording medium having perpendicular magnetic anisotropy,
   the second linear recording density being 15 or more kilobits per inch lower than the first linear recording density, and
   a recording current of the second signal being 30 or more mA.

2. A perpendicular magnetic recording method according to claim 1 wherein the first and second signals are recorded on a recording track in such a way that they are superimposed one upon the other.

3. A perpendicular magnetic recording method according to claim 1 wherein the recording track is provided with a first area and a second area which are arranged alternately, and the first signal is recorded on the first area and the second signal is then recorded on the second area.

4. A perpendicular magnetic recording method according to claim 1 wherein the first signal is recorded on the first recording track and the second signal is recorded on the second recording track, and the first recording track is partly overlapped with the second recording track.

5. A perpendicular magnetic recording method according to claim 1 wherein the first kind of signal is recorded on the first recording track and the second kind of signal is recorded on the second recording track, and both side edges of the first and the second signals are in contact with each other.

6. A perpendicular magnetic recording method according to claim 1 wherein the magnetic recording medium has a magnetic layer which is not thinner than 0.5 $\mu$m.

7. A perpendicular magnetic recording method according to claim 1 wherein both of the first and second signals are data signals.

8. A perpendicular magnetic recording method according to claim 1 wherein both of the first and second signals are servo-signals.

9. A method for recording according to claim 1, wherein the magnetic recording medium is formed of Co-Cr magnetic material, and the first signal is a servo-signal and the second signal is a data signal.

10. A method for recording according to claim 1, further comprising the step of recording at least a third signal on the recording medium, any signal being recorded with a recording current of 30 or more mA and in a linear recording density of at least 15 kilobits per inch lower than the density in which the preceding signal is recorded.

11. A perpendicular magnetic recording method according to claim 10 wherein the area where the any signal is recorded is partly overlapped with the area where the preceding signal is recorded.

12. A perpendicular magnetic recording method according to claim 10 wherein the area where the any signal is recorded is contacted with the area where the preceding signal is recorded.

13. A perpendicular magnetic recording method according to claim 10 wherein any of the signals is a data signal.

14. A perpendicular magnetic recording method according to claim 10 wherein any of the signals is a servo-signal.

15. A perpendicular magnetic recording method according to claim 10 wherein a part of the signals is a data signal and the remaining is a servo-signal.

16. A perpendicular magnetic recording method according to claim 10 wherein the magnetic recording medium has a magnetic layer which is not thinner than 0.5 $\mu$m.

* * * * *